(12) United States Patent
Martin et al.

(10) Patent No.: US 10,679,505 B2
(45) Date of Patent: Jun. 9, 2020

(54) AUTOMATIC VEHICLE CONTROL APPARATUS ABLE TO DETERMINE TRACK OCCUPANCY OF A VEHICLE, AND CORRESPONDING METHOD FOR AUTOMATICALLY CONTROLLING THE VEHICLE

(71) Applicant: ALSTOM Transport Technologies, Saint-Ouen (FR)

(72) Inventors: Phillip Martin, Melbourne, FL (US); Seneca Snyder, Melbourne, FL (US); Jared Cooper, Melbourne, FL (US)

(73) Assignee: ALSTOM Transport Technologies, Saint-Ouen (FR)

( * ) Notice: Subject to any disclaimer, the term of this patent is extended or adjusted under 35 U.S.C. 154(b) by 117 days.

(21) Appl. No.: 15/902,672

(22) Filed: Feb. 22, 2018

(65) Prior Publication Data
US 2019/0259281 A1    Aug. 22, 2019

(51) Int. Cl.
G08G 1/00 (2006.01)
G08G 1/16 (2006.01)
G08G 1/056 (2006.01)
G06T 7/70 (2017.01)

(52) U.S. Cl.
CPC ............ G08G 1/166 (2013.01); G06T 7/70 (2017.01); G08G 1/056 (2013.01); G06T 2207/30236 (2013.01)

(58) Field of Classification Search
USPC ......................................................... 701/19
See application file for complete search history.

(56) References Cited

U.S. PATENT DOCUMENTS

| 2014/0012438 A1* | 1/2014 | Shoppa | B61L 1/188 701/19 |
| 2014/0129061 A1* | 5/2014 | Cooper | B61L 15/0036 701/19 |
| 2015/0158510 A1* | 6/2015 | Fries | B61L 1/181 701/19 |

FOREIGN PATENT DOCUMENTS

| CA | 2 273 401 A1 | 12/1999 |
| DE | 102014220778 A1 | 4/2016 |

* cited by examiner

*Primary Examiner* — James M McPherson
(74) *Attorney, Agent, or Firm* — Pearne & Gordon LLP

(57) ABSTRACT

This automatic vehicle control apparatus comprises a first image sensor positioned on a vehicle, able to capture a first global image of a first scene, including an area in front of the vehicle, in a first field of view of said first image sensor; a track occupancy detector for receiving the first global image and deducing therefrom a track occupancy of the vehicle among at least two set of parallel tracks positioned in front of the vehicle; a distinguishable object disposed in the first field of view; and a proper functioning checking apparatus configured for searching, in the first global image, a first specific image of the distinguishable object, and for generating an alert signal in case the first specific image is not found in the first global image.

20 Claims, 4 Drawing Sheets

Figure 1:
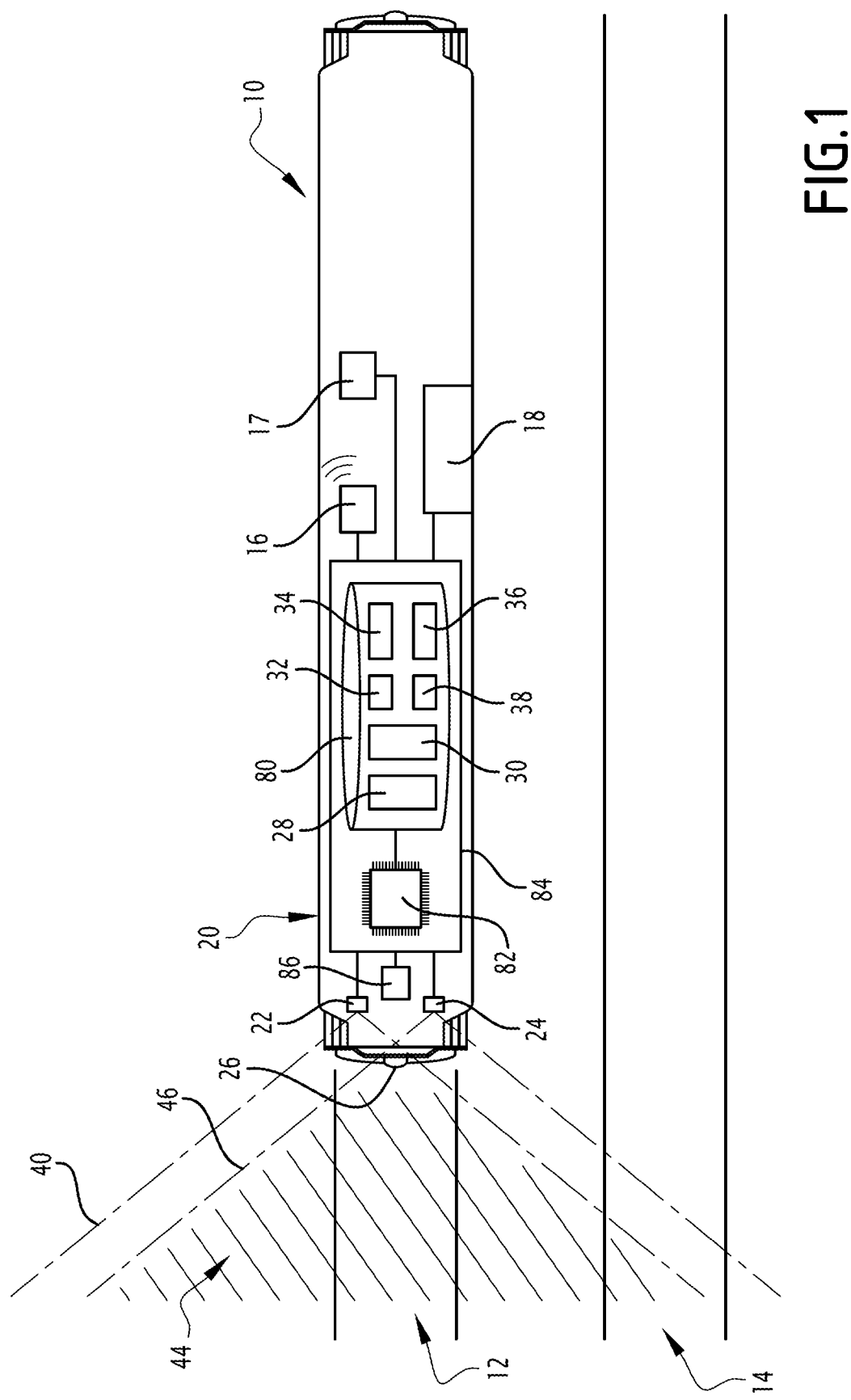

AUTOMATIC VEHICLE CONTROL APPARATUS ABLE TO DETERMINE TRACK OCCUPANCY OF A VEHICLE, AND CORRESPONDING METHOD FOR AUTOMATICALLY CONTROLLING THE VEHICLE

The present invention concerns an automatic vehicle control apparatus, of the type comprising:
- a first image sensor positioned on a vehicle, able to capture a first global image of a first scene, including an area in front of the vehicle, in a first field of view of said first image sensor; and
- a track occupancy detector for receiving the first global image and deducing therefrom a track occupancy of the vehicle among at least two set of parallel tracks positioned in front of the vehicle;

The invention further concerns a corresponding method for automatically controlling a vehicle.

These apparatus and method are more specifically dedicated to the automatic control of a rail vehicle.

Current rail vehicles are more and more equipped with train control systems able to drive the rail vehicles they equip. These systems are in particular intended to regulate the speed of the rail vehicle depending on the track on which the vehicle is positioned and on traffic regulation rules applying to said track.

While the track on which a rail vehicle is placed may be quite easily determined when the train is driving on a railroad having a single track, using a GPS system, this determination becomes very difficult for an automatic system when the train is in a section of a railroad network in which multiple parallel tracks are positioned close to each other. Indeed, while the tracks are often spaced from each other by a distance of less than 4 meters (3.442 meters in the United States), GPS accuracy for industrial applications is limited to an uncertainty on average of 7.8 meters for a confidence of 95% probability globally; thus, in locations where multiple tracks run parallel to each other, this uncertainty encompasses more than one track and, as a consequence thereof, determination of the track on which the train is positioned is impossible using solely a GPS system.

To remedy this problem, determination of the traveled track in places where multiple parallel tracks are positioned close to each other is usually left up to the operator, who has to manually enter the track into the train control system so that automated safe enforcement of operation may begin. Alternatively, the operator must control the train manually until the train control system receives a wayside feedback, such as a RFID tag sent by a beacon positioned on the side of the track, that will allow him to locate the train and provide automated safe enforcement of operation of the train.

However, in several automated train control systems, correct determination of the train location is a safety critical function, since incorrect positioning may lead to incorrect operation of the train which may cause derailment of said train. Yet, leading operation of the train to a human operator does not allow a sufficient safety level since human control is source of many hazards.

It is thus wished to provide a solution which may allow determination of the traveled track in places where multiple parallel tracks are positioned close to each other, without being subjected to human sourced hazards.

Such a solution is provided in CA 2 273 401, which discloses an automatic train control apparatus of the here above type.

However, this solution does not provide a sufficient degree of reliability to achieve a truly safe enforcement of operation of a train.

An object of the invention is therefore to allow quick and automated determination of the track on which a train travels in places where multiple parallel tracks are positioned close to each other, while achieving a sufficient safety and reliability level, and in particular while achieving a level of safety which is commonly known as vitality, i.e. a level of safety such that the result of hardware failure or the effect of software error of the system in charge of this determination either prohibits the system from assuming or maintaining an unsafe state, or causes the system to assume a state known to be safe.

To that end, a first subject-matter of the invention consists of an automatic train control apparatus of the type mentioned above, said automatic train control apparatus further comprising:
- a distinguishable object disposed in the first field of view; and
- a proper functioning checking apparatus configured for:
    - searching, in the first global image, a first specific image of the distinguishable object; and
    - generating an alert signal in case the first specific image is not found in the first global image.

According to particular embodiments of the invention, this automatic train control apparatus further has at least one of the features presented below, considered alone or along any combination of features which is technically feasible:
- the first image sensor is configured for refreshing the first global image at a first predetermined frequency;
- the automatic vehicle control apparatus comprises at least one second image sensor positioned on the vehicle, able to capture a second global image of a second scene, including the area in front of the vehicle, in a second field of view of said second image sensor, the distinguishable object being disposed in the second field of view, and the track occupancy detector being configured for receiving the second global image and deducing the track occupancy of the vehicle from both the first and second global images, wherein the proper functioning checking apparatus is further configured for:
    - searching, in the second global image, a second specific image of the distinguishable object;
    - measuring a distance between the first and second specific images; and
    - generating an alert signal in case the second specific image is not found in the second global image, and in case the distance between the first and second specific images is above a predetermined threshold;
- the second image sensor is configured for refreshing the second global image at a second predetermined frequency;
- the distinguishable object is positioned on the vehicle;
- the distinguishable object has at least one predefined physical attribute among: a pattern, a color, a reflectivity, a shape, and a size;
- the proper functioning checking apparatus is configured for looking for the at least one predefined physical attribute in a predetermined region of the first global image, and for concluding in the presence of the first specific image in the first global image in case the at least one predefined physical attribute is found in said predetermined region;

the distinguishable object consists of one of the following: a light that changes color periodically, a nose of the vehicle, a grab-bar of the vehicle;

the automatic vehicle control apparatus further comprises a position determination system configured for determining a portion of a railroad network in which the vehicle is positioned and for producing a positioning signal corresponding to said portion of the railroad network; and the automatic vehicle control apparatus further comprises:
a direction determination system configured for determining a direction of travel of the vehicle and for producing a direction signal corresponding to said direction of travel, and an autopilot, configured for automatically operating the vehicle in response to receiving the positioning signal, the direction signal, and the track occupancy of the vehicle.

A second subject-matter of the invention consists of a rail vehicle comprising the automatic train control apparatus defined above.

A third subject-matter of the invention consists of a method for automatically controlling a rail vehicle, the rail vehicle comprising a first image sensor having a first field of view, and a distinguishable object disposed in the first field of view, the method comprising the following steps:

capturing, by the first image sensor, a first global image of a first scene, including an area in front of the vehicle, in the first field of view, automatic searching, in the first global image, of a first specific image of the distinguishable object; and if the first specific image is not found in the first global image, automatic generation of an alert signal.

According to particular embodiments of the invention, this method further has at least one of the features presented below, considered alone or along any combination of features which is technically feasible:

the first global image is refreshed by the first image sensor at a predetermined frequency;

the vehicle comprises at least one second image sensor having a second field of view, and the method comprises the following additional steps:

capturing, by the second image sensor, a second global image of a second scene, including an area in front of the vehicle, in the second field of view, automatic searching, in the second global image, of a second specific image of the distinguishable object;

automatic measuring of a distance between the first and second specific images; and if the second specific image is not found in the second global image, or if the distance between the first and second specific images is above a predetermined threshold, automatic generation of an alert signal;

the second global image is refreshed by the second image sensor at a predetermined frequency;

the distinguishable object has at least one predefined physical attribute among: a pattern, a color, a reflectivity, a shape, a size;

searching the first specific image includes the following sub-steps:

looking for the at least one predefined physical attribute in a predetermined place of the first global image, and if the at least one predefined physical attribute is found in said predetermined place, concluding in the presence of the first specific image in the first global image;

the distinguishable object consists of one of the following: a light that changes color periodically, a nose of the vehicle, a grab-bar of the vehicle;

the method further comprises a step of automatically deducing from at least the first global image a track occupancy of the vehicle among at least two set of parallel tracks positioned in front of the vehicle and producing a track occupancy signal corresponding to said track occupancy of the vehicle;

the method further comprises a step of determining a portion of a railroad network in which the vehicle is positioned, and a step of automatically producing a positioning signal corresponding to said portion of the railroad network; and the method further comprises a step of automatically operating the vehicle in response to the positioning signal and the track occupancy signal.

Figure 2:
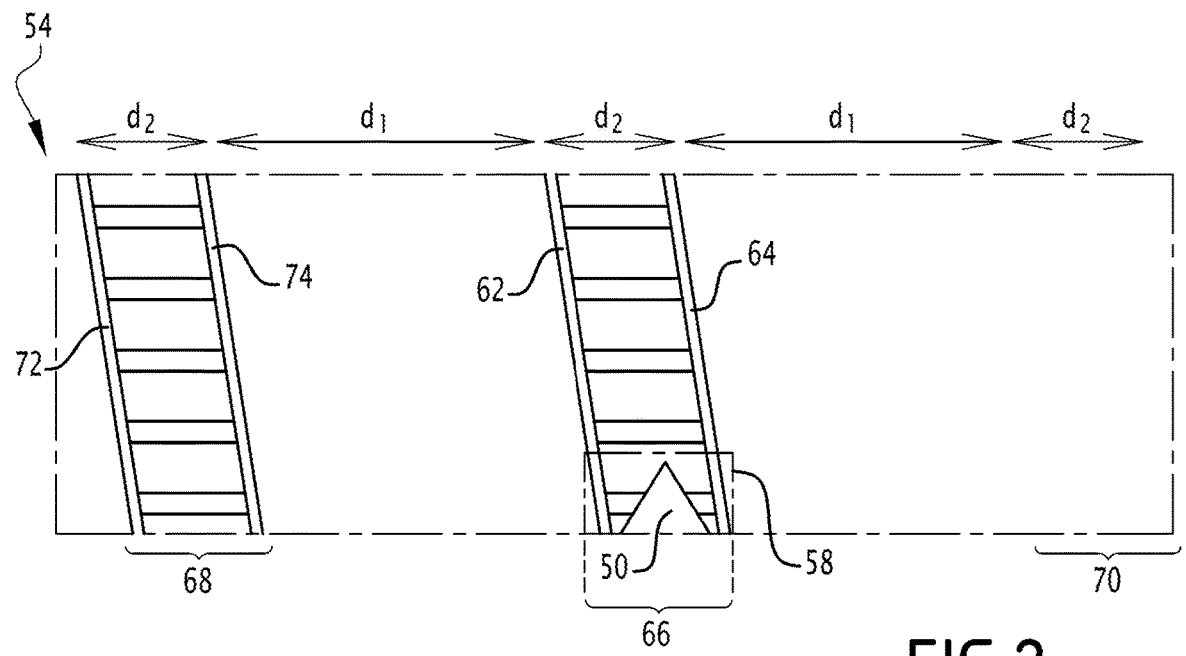
Figure 3:
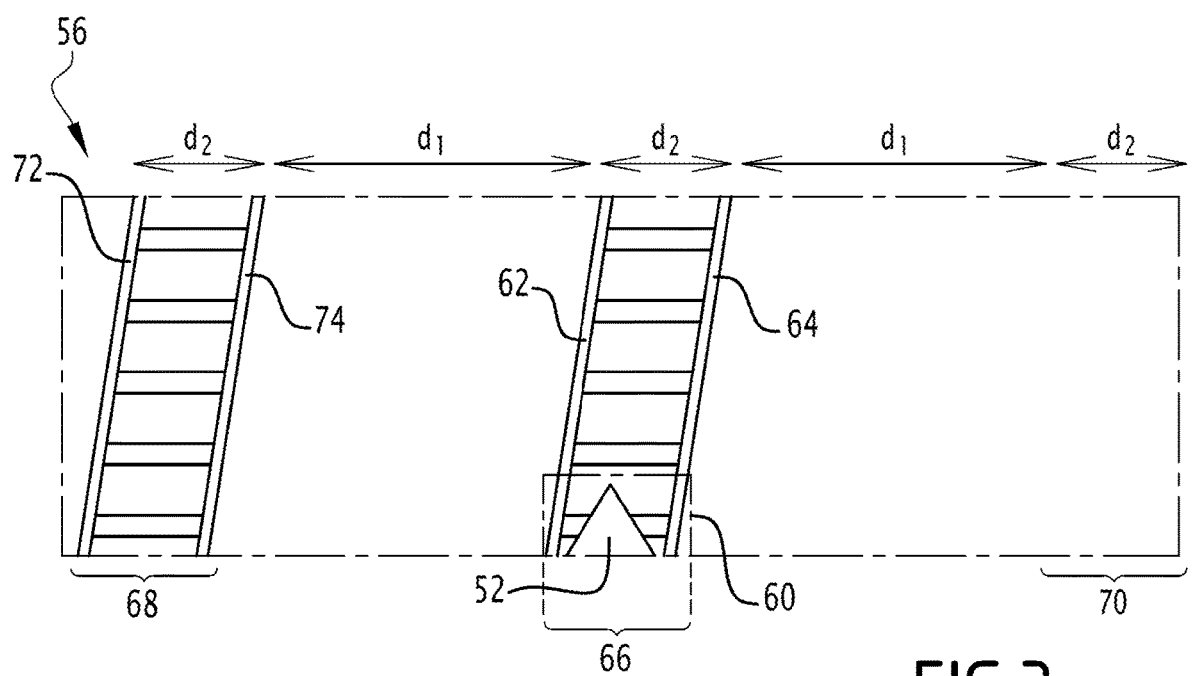
Figure 4:
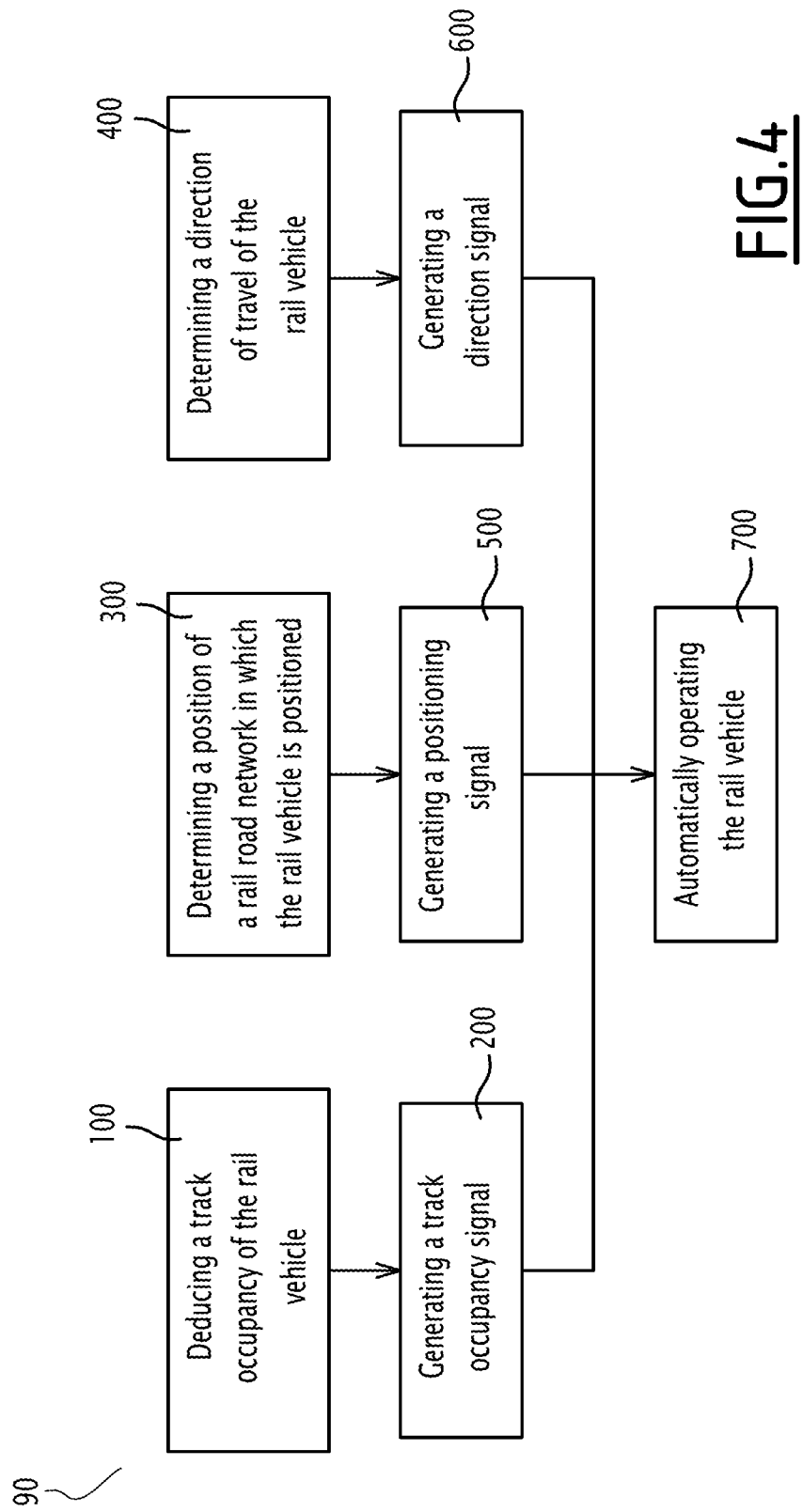
Figure 5:
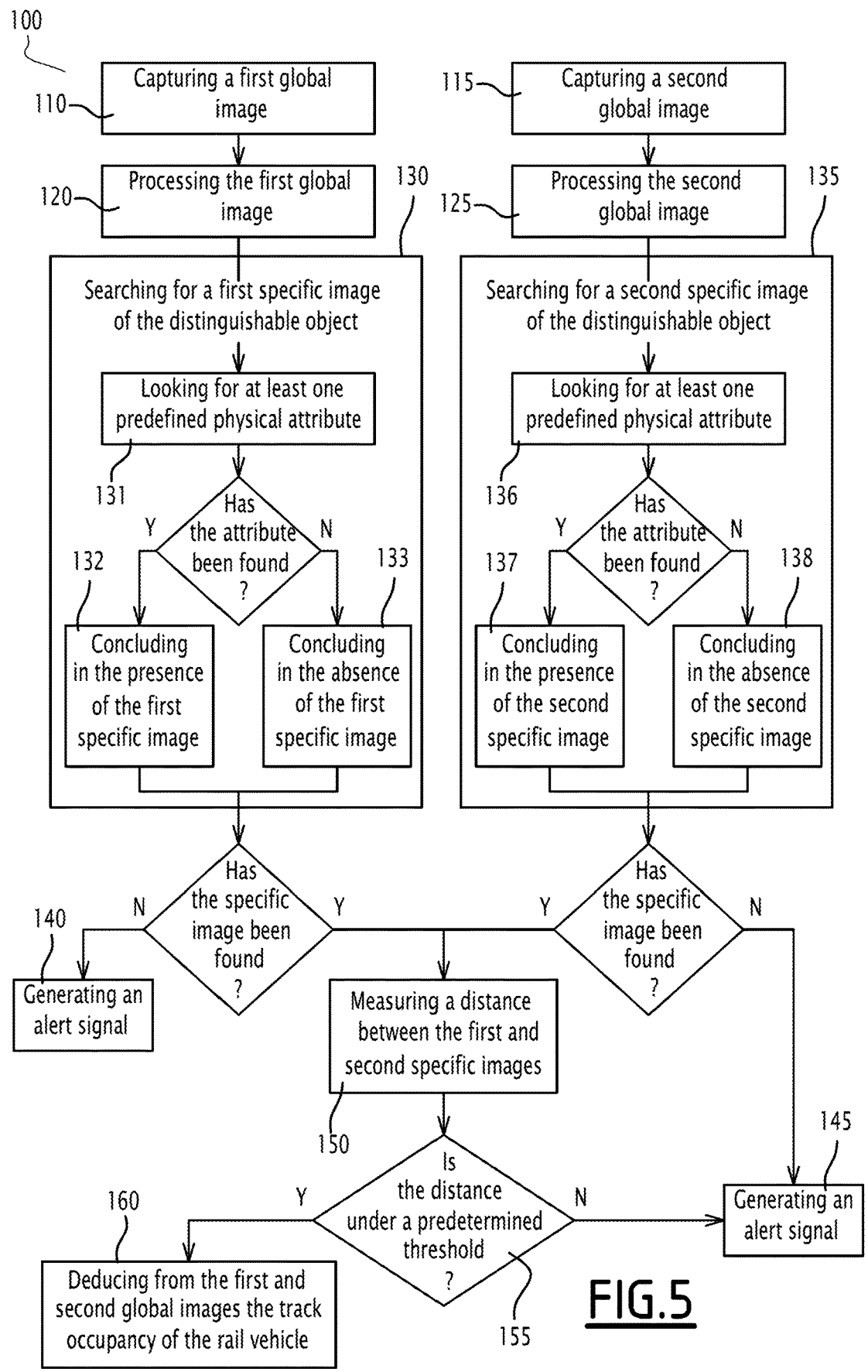

Other features and advantages of the invention will appear more clearly while reading the description here below, provided only as an example and made with reference to the attached drawings, wherein:

FIG. 1 is a view from above of a vehicle according to the invention, positioned on a rail track of a portion of railroad network, FIG. 2 is a view of a first global image provided by a first image sensor of the vehicle of FIG. 1, FIG. 3 is a view of a second global image provided by a second image sensor of the vehicle of FIG. 1, FIG. 4 is a block diagram illustrating a method for automatically controlling the vehicle of FIG. 1, and FIG. 5 is a block diagram detailing a step of the method of FIG. 4.

The vehicle 10 shown in FIG. 1 is located in a portion of a railroad network in which multiples parallel tracks 12, 14 are placed close to each other. The vehicle 10 is positioned on one of said tracks 12.

This vehicle 10 consists of a rail vehicle, preferably of the front car of a train (not shown) including several other rail cars (not shown) connected to said front car and positioned behind the front car. The words "front" and "behind" are here defined in reference with the direction of travel of the rail vehicle 10 along the track 12; this definition also applies to the following description.

The rail vehicle 10 consists for instance of a locomotive.

The rail vehicle 10 comprises a GPS module 16, an accelerometer 17, and a train operation system 18.

The GPS module 16 is able to determine the GPS coordinates of the rail vehicle 10 with an approximation of about 7.8 meters for a confidence of 95% probability; in other words, the GPS module 16 is able to determine with a probability of 95% that the rail vehicle 10 is within a disk of about 7.8 meters radius centered on said GPS coordinates. To that end, the GPS module 16 uses the Global Positioning System.

The accelerometer 17 is, in a known manner, able to determine an acceleration of the rail vehicle 10 along at least the travel direction of the rail vehicle 10, and preferably along any direction.

The train operation system 18 comprises a set of elements that allow operating the rail vehicle 10. These elements include for instance, in a known manner, a motor (not shown) for driving the wheels of the rail vehicle 10, a speed sensor (not shown) for measuring a speed of the rail vehicle 10, etc.

The rail vehicle 10 further comprises an automatic train control apparatus 20. This automatic train control apparatus 20 comprises a first image sensor 22, at least one second image sensor 24 (only one second image sensor 24 being shown here), a distinguishable object 26, an image processing system 28, a proper functioning checking apparatus 30, and a track occupancy detector 32. The automatic train control apparatus 20 further comprises a position determination system 34, a direction determination system 36, and an autopilot 38.

Alternatively the vehicle comprises only one image sensor such as the first image sensor. However, for security reasons, it is generally preferable to have two image sensors as described here-below.

The first image sensor 22 has a first field of view 40 and is able to capture a first global image of a first scene, including an area 44 in front of the rail vehicle 10, located in the first field of view 40. The first image sensor 22 is furthermore able to refresh the first global image at a first predetermined frequency, said first predetermined frequency being typically above 15 fps.

The or each second image sensor 24 has a second field of view 46 and is able to capture a second global image of a second scene, including the area 44 in front of the rail vehicle 10, located in the second field of view 46. The second image sensor 24 is able to capture this second global image synchronously with the capture of the first global image by the first image sensor 22; in other words, the second image sensor 24 is able to capture the second global image within a short time frame before or after the capture of the first global image by the first image sensor 22, said short time frame being typically shorter than 10 ms. The second image sensor 24 is furthermore able to refresh the second global image at a second predetermined frequency, said second predetermined frequency being typically above 15 fps.

The first and second predetermined frequencies are preferably substantially equal to each other.

Advantageously, the first and second image sensors 22, 24 are configured to provide the first and second global images in a RAW format.

The first and second image sensors 22, 24 typically consist of cameras.

The first and second image sensors 22, 24 are provided at a front end of the rail vehicle 10 and they are preferably spaced apart from each other along a transversal direction which is substantially orthogonal to a direction of travel of the rail vehicle 10 along the track 12, so that they provide together a stereoscopic vision of the front area 44.

The distinguishable object 26 is disposed in both the first field of view 40 and the second field of view 46, so that a first specific image 50 (FIG. 2) of this distinguishable object 26 is present in the first global image, and a second specific image 52 (FIG. 3) of this distinguishable object 26 is present in the second global image.

The distinguishable object 26 is positioned on the rail vehicle 10. In the shown example, it consists of the nose of the rail vehicle 10. Alternatively, it consists of a grab-bar (not shown) of the rail vehicle 10, or of a light (not shown) that changes color periodically, said light being placed for instance on the nose of the rail vehicle 10.

The distinguishable object 26 has at least one predefined physical attribute among: a pattern, a color, a reflectivity, a shape, and a size. In the shown example, the distinguishable object 26 comprises two predefined physical attributes, namely a triangular shape and a white color.

The image processing system 28 is configured for receiving the first and second global images captured by the sensors 22, 24, and for processing these images so as to produce processed first and second global images 54, 56 (FIGS. 2 and 3). To that end, the image processing system 28 is configured to un-distort the first and second global images by removing the lens distortion introduced by the optics in front of each sensor 22, 24, and to perform image rectification for both first and second global images, using a measured orientation of each sensor 22, 24 relative to a longitudinal axis of the rail vehicle 10, by projecting each one of the first and second global images onto a common image plane. Such un-distortion and image rectification processes are well-known to the skilled person and are described for instance in the articles available at the following URLs:
https://en.wikipedia.org/wiki/Distortion_(optics)
https://en.wikipedia.org/wiki/Image_rectification The un-distorted and rectified first global image constitutes the processed first global image 54. In a similar manner, the un-distorted and rectified second global image constitutes the processed second global image 56.

The proper functioning checking apparatus 30 is intended for checking that the first and second image sensors 22, 24 are properly functioning. To that end, the proper functioning checking apparatus 30 is configured for:

searching, in the first global image, more specifically in its processed version 54, the first specific image 50 of the distinguishable object 26, searching, in the second global image, more specifically in its processed version 56, the second specific image 52 of the distinguishable object 26, measuring a distance between these first and second specific images 50, 52, and generating an alert signal in case one of the first and second specific images 50, 52 is not found, and in case the distance between the first and second specific images 50, 52 is above a predetermined threshold.

To search the first or second specific image 50, 52 in one of the first and second global images 54, 56, the proper functioning checking apparatus 30 is configured for:

looking for the at least one predefined physical attribute of the distinguishable object 26 in a predetermined region 58, 60 of the global image 54, 56 only, and concluding in the presence of the specific image 50, 52 in the global image 54, 56 in case the at least one predefined physical attribute is found in said predetermined region 58, 60.

To measure the distance between the first and second specific images 50, 52, the proper functioning checking apparatus 30 is configured for using a well-known algorithm such as a keypoint matching or a histogram method providing a score of how close the images 50, 52 are.

The track occupancy detector 32 is configured for receiving the first and second global images, more specifically the processed versions 54, 56 thereof, and deducing therefrom a track occupancy of the rail vehicle 10 among the tracks 12, 14.

With reference to FIGS. 2 and 3, the track occupancy detector 32 is configured, to that end, for:

determining depth from the rail vehicle 10 and distances between any two pixels in each global image 54, 56, using the principals of stereoscopic images and the known distance and orientation between the image sensors 22, 24;

detecting two central rails 62, 64 in a central region 66 of each global image 54, 56, using edge detection or regular image processing algorithm;

defining proximal detection regions 68, 70 to the right and left of the central rails 62, 64, each proximal detection region 68, 70 being transversally spaced from the closest central rail 62, 64 by a distance $d_1$ slightly inferior to a minimum distance between parallel tracks in the railroad network and extending transversally along a distanced slightly superior to a maximum distance between the rails of a track in the railroad network;

looking for the edges of two proximal side rails 72, 74 in each one of the proximal detection regions 68, 70;

for each proximal detection region 68, 70 in which the edges of two proximal side rails 72, 74 have been found, defining a distal detection region (not shown) on the side of the proximal detection region 68, 70 opposite the central region 66, said distal detection region being transversally spaced from the proximal detection region 68, 70 by the distance $d_1$ and extending transversally along the distance $d_2$;

looking for the edges of two distal side rails in each distal detection; and deducing from the number of tracks detected on each side of the central region 66 the track on which the rail vehicle 10 is sited, and generating a track occupancy signal designating said track.

By "slightly inferior", it is meant that the distance $d_1$ is comprised between 95% and 100% of said minimum distance between parallel tracks. By "slightly superior", it is meant that the distanced is comprised between 100% and 105% of said maximum distance between the rails of a track.

For instance, distance $d_1$ is comprised between 3.270 meters and 3.442 meters if the rail vehicle 10 is intended to travel on North American or European railroad network, as minimum distance between parallel tracks in these regions is 3.442 meters. Also, distance $d_2$ is for instance comprised between 1.435 meters and 1.507 meters as standard distance, or "gauge", between rails of a track in these regions is 1.435 meters.

Preferably, the track occupancy detector 32 is also configured for measuring a transverse distance between the central rails 62, 64 prior to looking for tracks on the sides of the central region 66, for comparing this transverse distance with the standard gauge of the railroad network, and for discarding the first and second global images 54, 56 when the difference between the transverse distance and the standard gauge is above a predefined maximum threshold and/or under a predefined minimum threshold. Advantageously, the track occupancy detector 32 is further configured for generating an alert signal after a preset number of global images 54, 56 have been discarded within a predefined timeframe.

The position determination system 34 is configured for determining the portion of the railroad network in which the rail vehicle 10 is positioned and for producing a positioning signal corresponding to said portion of the railroad network. To that end, the position determination system 34 is configured for retrieving the GPS coordinates provided by the GPS module 16 and comparing these GPS coordinates with a pre-charged map of the railroad network.

The direction determination system 36 is configured for determining, in a known manner, the travel direction of rail vehicle 10 on the basis of the acceleration measured by the accelerometer 17, and for producing a direction signal corresponding to said direction of travel.

Finally, the autopilot 38 is configured for receiving the positioning signal, the direction signal and the track occupancy signal, and for sending, in response thereto, command signals to the train operation system 18 so as to automatically operate the rail vehicle 10. In particular, the autopilot 38 is configured for operating the rail vehicle 10 so as to meet operation regulations applying to the track 12 on which the rail vehicle 10 is sited, including regulating the speed of the rail vehicle 10 so as to not exceed speed limits applying to said track 12.

Returning to FIG. 1, the image processing system 28, the proper functioning checking apparatus 30, the track occupancy detector 32, the position determination system 34, the direction determination system 36 and the autopilot 38 are here all implemented as computer programs stored in a memory 80 and configured so as to be executed by a processor 82 associated with said memory 80, the processor 82 and the associated memory 80 forming together an information processing unit 84 included in the train control apparatus 20. In alternative (not shown), at least part of the image processing system 28, the proper functioning checking apparatus 30, the track occupancy detector 32, the position determination system 34, the direction determination system 36 and the autopilot 38 is implemented as a programmable logic component, or as dedicated integrated circuits, included in the train control apparatus 20.

In the shown example, the train control apparatus 20 further comprises a presentation device 86 for presenting to an operator of the rail vehicle 10 the alert signals generated by the proper functioning checking apparatus 30 and the track occupancy detector 32. This presentation device 86 typically includes a display (not shown) and/or a loudspeaker (not shown).

In option, or in alternative to the presentation device 86, the train control apparatus 20 also comprises a reboot system (not shown) for automatically rebooting at least part of the train control apparatus 20 when an alert signal is generated by the proper functioning checking apparatus 30 or the track occupancy detector 32.

A method 90 for automatically controlling the rail vehicle 10 using the train control apparatus 20 will further be described, with reference to FIG. 4.

The method 90 comprises a first step 100 of deducing a track occupancy of the rail vehicle 10.

As shown in FIG. 5, this first step 100 comprises first sub-steps 110, 115 of capturing the first and second global images. During these sub-steps 110, 115, the first and second global images are captured by the first and second image sensors 22, 24 and are refreshed, respectively, at the first and second predetermined frequencies.

These sub-steps 110, 115 are followed respectively by sub-steps 120, 125 of processing the first and second global images. During these sub-steps 120, 125, the first and second global images are processed by the image processing system 28 so as to remove lens distortion introduced by the optics in front of each sensor 22, 24, and as to perform image rectification for both first and second global images.

These sub-steps 120, 125 are followed respectively by sub-steps 130, 135 of searching for the first and second specific images 50, 52 of the distinguishable object 26. During these sub-steps 130, 135, the proper functioning checking apparatus 30 searches the first specific image 50 in the processed first global image 54, and the second specific image 52 in the processed second global image 56.

Each one of the sub-steps 130, 135 comprises a first sub-step, respectively 131, 136, of looking in the global image 54, 56 for the at least one predefined physical attribute of the distinguishable object 26. During this sub-step 131, 136, the proper functioning checking apparatus 30 looks for the at least one predefined physical attribute of the distinguishable object 26 only in a predetermined region 58, 60 of the global image 54, 56.

If this at least one attribute is found in said predetermined region 58, 60, the first sub-step 131, 136 is followed by a stub-step, respectively 132, 137, of concluding in the presence of the specific image 50, 52, during which the proper functioning checking apparatus 30 concludes in the presence of the specific image 50, 52 in the global image 54, 56. If this at least one attribute is not found in said predetermined region 58, 60, the first sub-step 131, 136 is followed by a stub-step, respectively 133, 138, of concluding in the absence of the specific image 50, 52, during which the proper functioning checking apparatus 30 concludes in the absence of the specific image 50, 52 in the global image 54, 56.

Following sub-steps 130, 135, step 100 comprises a sub-step, respectively 140, 145, of generating an alert signal, during which the proper functioning checking apparatus 30 generates an alert signal, when the proper functioning checking apparatus 30 has previously concluded in the absence of the specific image 50, 52 in the global image 54, 56. If however the proper functioning checking apparatus 30 has previously concluded in the presence of the specific image 50, 52 in both global images 54, 56, the sub-steps 130, 135 are followed by a step 150 of measuring a distance between the first and second specific images 58, 60.

In the example shown in FIGS. 2 and 3, since a white triangle can be seen in both predetermined regions 58, 60, said white triangle having all the physical attributes of the distinguishable object 26, the proper functioning checking apparatus 30 concludes in the presence of a specific image 50, 52 of the distinguishable object 26 in both global images 54, 56, and the method can proceed further with the measure 150 of the distance between the first and second specific images 50, 52.

However, if one of the image sensors 22, 24 had been displaced so that the white triangle would no longer have been placed in one of the predetermined regions 58, 60, the proper functioning checking apparatus 30 would have concluded in a malfunction of the image sensors 22, 24 and would have triggered an alert signal. It can thus be seen that the invention allows easy detection of displacement or inhibition of one of the image sensors 22, 24.

During sub-step 150, the proper functioning checking device 30 measures a distance between the first and second specific images 50, 52 using a well-known algorithm such as a keypoint matching or a histogram method providing a score of how close the images 50, 52 are. This distance is then compared to a predetermined threshold during a sub-step 155 and, if this distance is under said threshold, the track occupancy detector 32 proceeds with deducing the track occupancy of the rail vehicle 10 from the first and second global images 54, 56 during a following sub-step 160. If, on the contrary, the measured distance is above the predetermined threshold, the proper functioning checking device 30 generates an alert signal.

In the example shown in FIGS. 2 and 3, even though first and second specific images 50, 52 have to be found in both global images 54, 56, these images 50, 52 may change depending on the weather, the time of the day, etc., or if the distinguishable object 26 is set so as to change aspect regularly, such as when said distinguishable object 26 consists of a light that changes color periodically. Thus, if one of the global images 54, 56 is stale, refreshment of the other global image 54, 56 will cause change in the corresponding specific image 50, 52 and the refreshed specific image 50, 52 will no longer match the stale specific image 50, 52, thus resulting in the trigger of an alarm signal. It can thus be seen that the invention allows easy detection of freezing of one of the image sensors 22, 24.

Preferably, the steps of generating an alert signal, such as sub-steps 140, 145, are followed by a step (not shown) of presenting said alert signal to the operator via the presentation device 86, and/or by a step (not shown) of rebooting at least part of the automatic train control apparatus 20.

During sub-step 160, the track occupancy detector 32 deduces from the first and second global images 54, 56 a track occupancy of the rail vehicle 10 among the tracks 12, 14. To that end, the track occupancy detector 32:

determines depth from the rail vehicle 10 and distances between any two pixels in each global image 54, 56, using the principals of stereoscopic images and the known distance and orientation between the image sensors 22, 24;

detects two central rails 62, 64 in a central region 66 of each global image 54, 56, using edge detection or regular image processing algorithm;

defines proximal detection regions 68, 70 to the right and left of the central rails 62, 64, each proximal detection region 68, 70 being transversally spaced from the closest central rail 62, 64 by a distance $d_1$ slightly inferior to a minimum distance between parallel tracks in the railroad network and extending transversally along a distanced slightly superior to a maximum distance between the rails of a track in the railroad network;

looks for the edges of two proximal side rails 72, 74 in each one of the proximal detection regions 68, 70;

for each proximal detection region 68, 70 in which the edges of two proximal side rails 72, 74 have been found, defines a distal detection region (not shown) on the side of the proximal detection region 68, 70 opposite the central region 66, said distal detection region being transversally spaced from the proximal detection region 68, 70 by the distance $d_1$ and extending transversally along the distance $d_2$;

looks for the edges of two distal side rails in each distal detection; and deduces from the number of tracks detected on each side of the central region 66 the track on which the rail vehicle 10 is sited.

Returning to FIG. 3, following step 100, the method 90 comprises a step 200 of generating a track occupancy signal during which the track occupancy detector 32 generates a track occupancy signal designating the track on which the rail vehicle 10 is sited.

Substantially simultaneously with step 100, the method 90 comprises a step 300 of determining a portion of the railroad network in which the rail vehicle 10 is located, and a step 400 of determining a direction of travel of the rail vehicle 10.

During step 300, the position determination system 34 retrieves the GPS coordinates provided by the GPS module 16, compares these GPS coordinates with a pre-charged map of the railroad network, and deduces therefrom the portion of the railroad network in which the rail vehicle 10 is positioned.

During step 400, the direction determination system 36 determines, in a known manner, the travel direction of rail vehicle 10 on the basis of the acceleration measured by the accelerometer 17.

Steps 300 and 400 are followed, respectively, by a step 500 of generating a positioning signal, and by a step 600 of generating a direction signal.

During step 500, the position determination system 34 generates a positioning signal corresponding to the portion of the railroad network in which the rail vehicle 10 is positioned.

During step 600, the direction determination system 36 generates a direction signal corresponding to the travel direction of rail vehicle 10.

Finally, steps 200, 500 and 600 are followed by a step 700 of automatically operating the rail vehicle 10.

During this step 700, the autopilot 38 receives the positioning signal, the direction signal and the track occupancy signal, and sends, in response thereto, command signals to the train operation system 18 so as to automatically operate the rail vehicle 10. In particular, the autopilot 38 operates the rail vehicle 10 so as to meet operation regulations applying to the track 12 on which the rail vehicle 10 is sited, and notably regulates the speed of the rail vehicle 10 so as to not exceed speed limits applying to said track 12.

Owing to the invention described above, the rail vehicle 10 can be automatically operated in places where multiple parallel tracks are positioned close to each other, as soon as the rail vehicle 10 reaches such a place, and with the highest degree of safety.

Even though the description provided above is focused on the case in which the vehicle 10 consists of a rail vehicle, the invention is not limited to this single embodiment. Alternatively, the vehicle 10 consists of a motor vehicle, such as high railer, or of a flying drone.

The invention claimed is:

1. An automatic vehicle control apparatus, comprising:
   a first image sensor positioned on a vehicle, the first image sensor being configured to capture a first global image of a first scene, including an area in front of the vehicle, in a first field of view of the first image sensor;
   a distinguishable object disposed in the first field of view;
   at least one integrated circuit including:
      a detector for receiving the first global image and deducing therefrom a track occupancy of the vehicle among at least two sets of parallel tracks positioned in front of the vehicle; and
      an apparatus for checking the proper functioning of sensors including at least the first image sensor, the apparatus configured for:
         searching, in the first global image, a first specific image of the distinguishable object; and
         generating an alert signal in case the first specific image is not found in the first global image.

2. The automatic vehicle control apparatus of claim 1, wherein the first image sensor is configured for refreshing the first global image at a first predetermined frequency.

3. The automatic vehicle control apparatus of claim 1, comprising at least one second image sensor positioned on the vehicle, the at least one second image sensor being configured to capture a second global image of a second scene, including the area in front of the vehicle, in a second field of view of the at least one second image sensor, the distinguishable object being disposed in the second field of view, and the being configured for receiving the second global image and deducing the track occupancy of the vehicle from both the first and second global images, wherein the apparatus for checking the proper functioning of the sensors is further configured for:
   searching, in the second global image, a second specific image of the distinguishable object;
   measuring a distance between the first and second specific images; and
   generating an alert signal in case the second specific image is not found in the second global image, and in case the distance between the first and second specific images is above a predetermined threshold.

4. The automatic vehicle control apparatus of claim 3, wherein the at least one second image sensor is configured for refreshing the second global image at a second predetermined frequency.

5. The automatic vehicle control apparatus of claim 1, wherein the distinguishable object is positioned on the vehicle.

6. The automatic vehicle control apparatus of claim 1, wherein the distinguishable object has at least one predefined physical attribute among: a pattern, a color, a reflectivity, a shape, and a size.

7. The automatic vehicle control apparatus of claim 6, wherein the apparatus for checking the proper functioning of the sensors is configured for looking for the at least one predefined physical attribute in a predetermined region of the first global image, and for concluding in a presence of the first specific image in the first global image in case the at least one predefined physical attribute is found in the predetermined region.

8. The automatic vehicle control apparatus of claim 1, wherein the distinguishable object consists of one of the following: a light that changes color periodically, a nose of the vehicle, a grab-bar of the vehicle.

9. The automatic vehicle control apparatus of claim 1, wherein the at least one integrated circuit further includes a position determination system configured for determining a portion of a railroad network in which the vehicle is positioned and for producing a positioning signal corresponding to the portion of the railroad network.

10. The automatic vehicle control apparatus of claim 9, wherein the at least one integrated circuit further includes:
   a direction determination system configured for determining a direction of travel of the vehicle and for producing a direction signal corresponding to the direction of travel, and
   an autopilot, configured for automatically operating the vehicle in response to receiving the positioning signal, the direction signal, and the track occupancy of the vehicle.

11. A vehicle, comprising the automatic vehicle control apparatus of claim 1.

12. A method for automatically controlling a vehicle, the vehicle comprising a first image sensor having a first field of view, and a distinguishable object disposed in the first field of view, the method comprising the following steps:
   capturing, by the first image sensor, a first global image of a first scene, including an area in front of the vehicle, in the first field of view,
   deducing, from the first global image received, a track occupancy of the vehicle among at least two sets of parallel tracks positioned in front of the vehicle, and
   checking the proper functioning of the first image sensor, by:
      automatic searching, in the first global image, of a first specific image of the distinguishable object; and
      if the first specific image is not found in the first global image, automatic generation of an alert signal.

13. The method of claim 12, wherein the first global image is refreshed by the first image sensor at a predetermined frequency.

14. The method of claim 12, wherein the vehicle comprises at least one second image sensor having a second field of view, and the method comprises the following additional steps:

capturing, by the at least one second image sensor, a second global image of a second scene, including an area in front of the vehicle, in the second field of view, automatic searching, in the second global image, of a second specific image of the distinguishable object;

automatic measuring of a distance between the first and second specific images; and if the second specific image is not found in the second global image, or if the distance between the first and second specific images is above a predetermined threshold, automatic generation of an alert signal.

15. The method of claim 12, wherein the distinguishable object has at least one predefined physical attribute among: a pattern, a color, a reflectivity, a shape, a size.

16. The method of claim 15, wherein searching the first specific image includes the following sub-steps:

looking for the at least one predefined physical attribute in a predetermined place of the first global image, and if the at least one predefined physical attribute is found in the predetermined place, concluding in the presence of the first specific image in the first global image.

17. The method of claim 12, wherein the distinguishable object consists of one of the following: a light that changes color periodically, a nose of the vehicle, a grab-bar of the vehicle.

18. The method of claim 12, further comprising a step of automatically deducing from at least the first global image a track occupancy of the vehicle among at least two sets of parallel tracks positioned in front of the vehicle and producing a track occupancy signal corresponding to the track occupancy of the vehicle.

19. The method of claim 18, further comprising a step of determining a portion of a railroad network in which the vehicle is positioned, and a step of automatically producing a positioning signal corresponding to the portion of the railroad network.

20. The method of claim 19, further comprising a step of automatically operating the vehicle in response to the positioning signal and the track occupancy signal.

\* \* \* \* \*